April 20, 1926.
L. S. ROBERTS
FRENCH DRIP PERCOLATOR
Filed Feb. 18, 1924
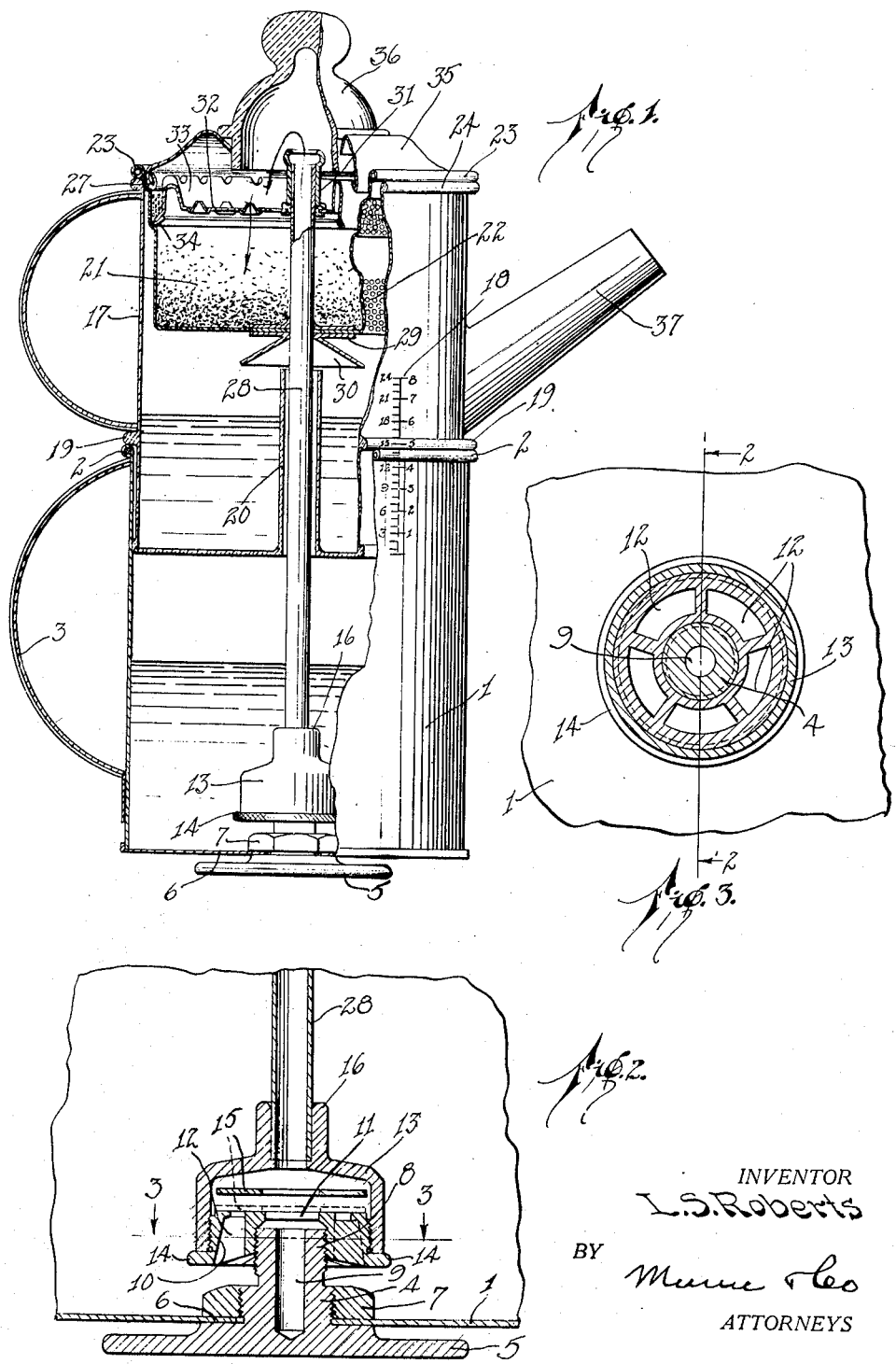
INVENTOR
L.S.Roberts
BY
ATTORNEYS Patented Apr. 20, 1926.

1,581,871

UNITED STATES PATENT OFFICE.

LLOYD S. ROBERTS, OF HAMILTON, MONTANA.

FRENCH DRIP PERCOLATOR.

Application filed February 18, 1924. Serial No. 693,694.

*To all whom it may concern:*

Be it known that I, LLOYD S. ROBERTS, a citizen of the United States, and a resident of Hamilton, county of Ravalli, State of Montana, have invented a new and useful Improvement in French Drip Percolators, of which the following is a full, clear, and exact description.

My invention relates to improvements in devices for preparing coffee or tea, and it consists in the combinations, constructions and arrangements herein described and claimed.

Among those who use coffee or tea as beverages, it is well known that the best beverage is obtained when it is prepared without boiling. In the French drip method, the ground coffee is held in a cup at the top of the device and boiling water is poured over the coffee grounds from time to time and the extract is allowed to drip downwardly into the bottom. This makes good coffee but is is a slow and tedious process because of the necessity of pouring the water over the grounds. Ordinarily, before serving the coffee, the pot has to be placed in a pan of boiling water to heat it, as it cannot be placed directly on the stove without fear of boiling.

The ordinary percolators pump water through a tube up over the coffee grounds, and then permit it to drain back into the water. Here the coffee is boiled and becomes stronger the longer it is over the fire. This is apt to make bitter coffee.

An object of my invention is to provide a device in which the beverage is not boiled.

A further object of my invention is to provide a device which does not necessitate the constant manual pouring and repouring of the water over the coffee grounds.

A further object of my invention is to provide a combination of the percolator and French drip mechanism in a simple device.

Other objects and advantages will appear in the following specification, and the novel features of the invention will be particularly pointed out in the appended claim.

My invention is illustrated in the accompanying drawings, forming part of this application, in which—

Figure 1 is a section through the device, certain parts being broken away, and others being shown in elevation for the sake of clearness.

Figure 2 is a section along the line 2—2 of Figure 3, and

Figure 3 is a section along the line 3—3 of Figure 2.

In carrying out my invention I make use of a bottom container 1 which is preferably made of metal such as aluminum and which is provided with a bead 2 at the top thereof. The container 1 is also provided with a handle 3.

In the bottom of the container is a central opening and through this central opening extends a reduced threaded portion 4 of a base 5. The base is provided with a shoulder 6 arranged to receive and support the bottom of the container 1. A nut 7 is provided which is screwed onto the reduced portion 4 so as to form a water-tight connection between the base and the container which it supports. The extension 4 is prolonged and is further reduced and threaded as shown at 8. A central bore 9 is provided extending downwardly toward the bottom of the base.

Carried by the threaded extension 8 is a valve casing. This consists of a ring-like member 10 which is threaded to screw onto the threaded extension 8. The ring is provided with a central opening 11 and also with circular openings 12, (see Figures 2 and 3) leading downwardly into the interior of the container 1. The ring 10 is threaded exteriorly to receive a casing member 13 which is screwed to the ring and whose lower end abuts the flange 14 on the ring. A valve 15 is disposed within the casing 13 and normally covers the openings 12 as shown in dotted lines in Figure 2. The upper part of the casing has an extension 16 provided with a central bore extending downwardly and terminating short of the interior of the casing to provide a shoulder.

The upper compartment which is designed to contain the beverage consists of a receptacle 17 preferably made of glass and which is provided with a scale 18 graduated to indicate the number of cups of ordinary size and also to indicate the number of demitasse or after dinner cups, so that the cook can tell at a glance just how much beverage is in the receptacle 17. The receptacle 17 is provided with a bead or flange 19 which permits it to rest on the top of the container 1. It is also provided with a central tube 20 which extends upwardly through the bottom, as shown in Figure 1.

In the upper part of the receptacle 17 is disposed a metal basket 21 having perforations 22. The basket is provided with a bead 23 at its upper end which is arranged to rest on the bead or flange 24 at the top of the receptacle 17 so as to suspend the basket in position. A pipe 28 is secured to the basket by means of retaining plates 29, one of which forms a deflector 30 for preventing the beverage from entering the top of the tube 20. The pipe 28 is arranged to extend through the tube 20 and into the socket or bore in the top of the extension 16, (see Figure 2).

Arranged to fit over the upper end of the pipe 28 is a tube 31 which is open at its top. This tube is secured to a distributor plate or pan 32 having walls 33 whose upper edges are bent downwardly and thence outwardly and which rest at 34 on a shoulder of the basket 21.

The top is preferably made of a metal ring 35 whose outer edges 27 enter between the walls 33 of the distributor pan 32 and the walls of the basket 21 where they rest on another shoulder of the basket 21 as shown in the drawings. A glass dome 36 is disposed in a central opening of the ring 35 through which the percolating operation may be viewed. The receptacle 17 is provided with a spout 37 and a handle as shown in the drawings.

From the foregoing description of the various parts of the device, the operation thereof may be readily understood. Water is first placed in the lower receptacle. Coffee grounds or tea leaves are placed in the basket. The basket is then placed in receptacle 17, the pipe 28 entering through the tube 20. The recetacle 17 is then placed upon the lower container, the pipe 28 entering the socket in the extension 16. The distributing pan is placed on the upper end of the pipe 28 and the cover is placed in position. The device is then heated over a fire. The water in the lower container is boiled and in the boiling operation the valve 15 is lifted and the steam and small portions of water are forced upwardly and out against the glass dome 36 in a manner similar to the ordinary percolator. The water runs down into the distributing pan which, as will be seen, is provided with openings and is distributed over the coffee grounds in the basket, thus extracting the essence from the coffee grounds and dripping out into the upper receptacle. This liquid which drips down into the upper receptacle is the coffee beverage in its finished form, ready to drink. It is to be noted that this coffee beverage does not come in contact a second time with the coffee grounds nor does it come in contact with the water in the bottom container. Thus it will be seen that from the time the first drop of the coffee essence has dripped through the coffee grounds contained in the basket until the full cup or cups have dripped through nothing enters the upper receptacle except the pure coffee beverage and as this upper receptacle is within the lower receptacle, which contains water, this pure coffee beverage is never allowed to boil.

The upper receptacle may be removed or the pot as a whole may be tilted so as to pour the liquid out of the spout 37. Owing to the transparent nature of the upper receptacle 17 and the fact that it is gauged to indicate the amount of beverage in cups, the cook can readily see just how much beverage she has. It will thus be seen that I have provided a device in which the operation of making the coffee is automatic, as in a percolator, but which obviates the boiling of the coffee or tea which occurs in the ordinary percolator. The device, as described, obviates the necessity of pouring hot water over the coffee grounds, as stated.

I claim:

In a beverage making device, a lower metal compartment, a removable transparent upper compartment carried by said lower compartment, a perforated basket carried by said upper compartment for containing solid matter, said upper compartment being provided with a sleeve projecting upwardly from its bottom and terminating short of the basket, a tube secured to said basket and arranged to pass freely through the sleeve into the lower compartment, the upper end of the tube projecting above the top of the basket and a deflector carried by the bottom portion of the basket and arranged to extend over the upper end of said sleeve for preventing the liquid from flowing downwardly through said sleeve into the lower compartment, the upper part of said lower compartment and the lower part of said upper compartment being provided with registering scales to indicate the contents of the upper compartment.

LLOYD S. ROBERTS.